T. C. WALTER.
Thill Coupling.
No. 94,853.
Patented Sept. 14, 1869.
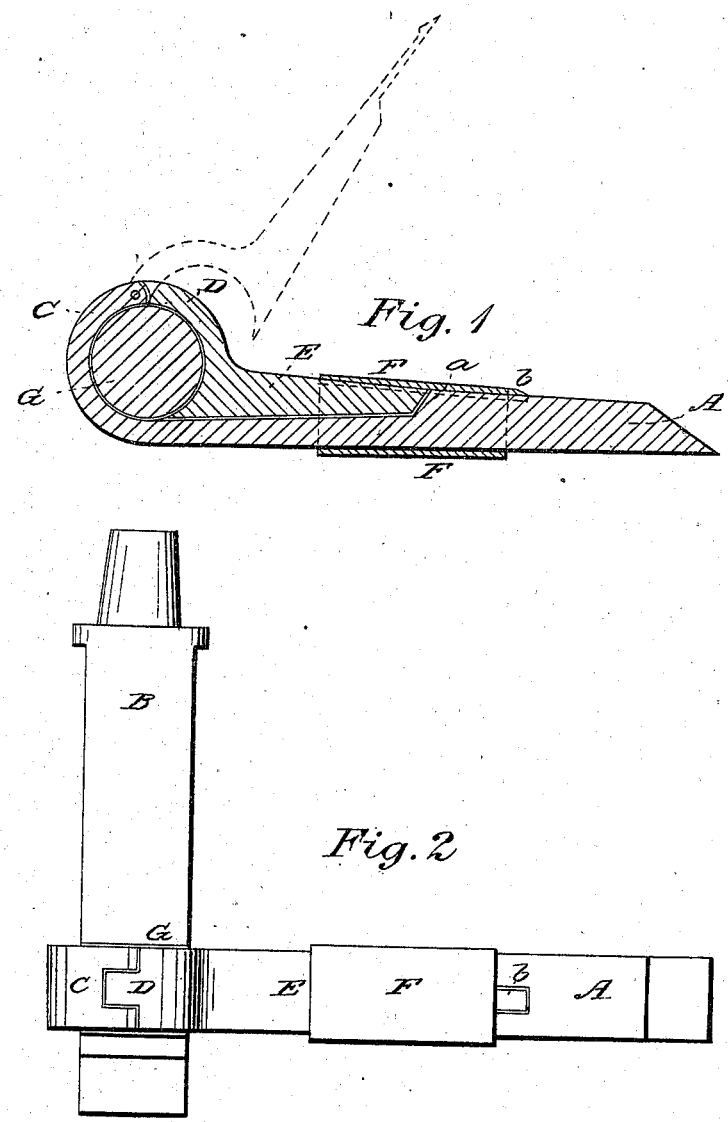
Witnesses:
John L. Borne
Geo. H. Strong.
Inventor:
Thomas C. Walter

United States Patent Office.

THOMAS C. WALTER, OF SAN FRANCISCO, CALIFORNIA.

Letters Patent No. 94,853, dated September 14, 1869.

IMPROVEMENT IN THILL-COUPLINGS.

The Schedule referred to in these Letters Patent and making part of the same.

*To all whom it may concern:*

Be it known that I, THOMAS C. WALTER, of the city and county of San Francisco, State of California, have invented an Improved Pole and Shaft Attachment to Vehicles; and I do hereby declare the following description and accompanying drawings are sufficient to enable any person skilled in the art or science to which it most nearly appertains, to make and use my said invention or improvements, without further invention or experiment.

The nature or essence of my invention consists in a peculiar arrangement of the several parts of a device, to be fully described below, for securing the thills or shafts of vehicles to the axle.

In order to more fully illustrate and describe my invention, reference is had to the accompanying drawings, forming a part of this specification, in which—

Figure 1 is a side elevation.
Figure 2 is a top view.

A represents the rear end of the pole or shafts, and
B, a section of the front axle of any wheeled vehicle.

The only difference in the construction of the pole or shafts from those ordinarily employed, is in the arrangement of that part which attaches to the vehicle.

At the rear end of the pole or shafts I secure a metal or other bar, which is represented by A, and is similar to that commonly employed. The extreme end of this bar is reduced in size, forming a shoulder at *a*, and is turned so as to form a semicircle, C.

Another semicircular piece of metal or segment, D, is jointed or hinged to the end of C, so that when it is closed a perfect band or ring is formed.

To the segment D is secured an extended projection, E, which, when the segment is closed, fits into the reduced portion of the metal bar A, forming a close joint against the shoulder *a*.

A spring, *b*, with enlarged head, is attached to the end of the projection E, and extends a short distance along the bar A, the bar being slotted to receive it, so that, with the exception of the enlarged head, it will lie flush with the top of the bar.

A square band, F, which encircles the bar A, is then slipped over the projection E, until it has passed the enlarged head, thus binding the two together, the head preventing it from moving from its position.

B represents simply a short section of the front iron axle, being that portion next to the journal. At the proper or suitable point on this iron axle I cut away or turn down a width of metal, as at G, sufficient to receive the width of the bar A on the pole or shaft, until it is of the proper size to be received in the ring or band formed on the end of the pole or shaft.

If desired, the part at G can be turned sufficiently wide to allow of rubber bands to be placed on each side of the bar A, in order to prevent rattling.

To attach the pole or shafts to the axle, the segment D is opened on its hinge, and the turned portion of the axle received in the ring, after which the segment D is closed and secured by the band, which prevents the two from separating.

By this means the pole or shafts can be attached to vehicles so as to be perfectly safe and reliable. There will be no danger of any of the parts breaking, as the strain will come upon the bar at C.

The usual bolts and nuts are also dispensed with, thus avoiding the liability of frightening the horse by the nut coming off, and the pole or shaft becoming detached by the withdrawing of the bolt.

Having thus described my invention,

What I claim, and desire to secure by Letters Patent, is—

The arrangement of the several parts of the above-described device, when the movable part of the eye D is hinged directly to the other part C, while the prolongation E of the former is secured in the recess at *a* by the band or slide F, held by the spring *b*, substantially as described.

In witness whereof, I have hereunto set my hand and seal.

THOMAS C. WALTER. [L. S.]

Witnesses:
GEO. H. STRONG,
WM. GERLACH.